United States Patent
Hannya

(10) Patent No.: US 9,827,673 B2
(45) Date of Patent: Nov. 28, 2017

(54) ROBOT CONTROLLER INHIBITING SHAKING OF TOOL TIP IN ROBOT EQUIPPED WITH TRAVEL AXIS

(71) Applicant: FANUC CORPORATION, Yamanashi (JP)

(72) Inventor: Tsuyoshi Hannya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/227,146

(22) Filed: Aug. 3, 2016

(65) Prior Publication Data
US 2017/0043481 A1 Feb. 16, 2017

(30) Foreign Application Priority Data
Aug. 10, 2015 (JP) .................. 2015-158373

(51) Int. Cl.
*B25J 9/16* (2006.01)

(52) U.S. Cl.
CPC ... *B25J 9/1641* (2013.01); *G05B 2219/39195* (2013.01); *G05B 2219/49169* (2013.01); *Y10S 901/01* (2013.01)

(58) Field of Classification Search
CPC ....... B25J 9/1641; B25J 9/041; Y10S 901/01; G05B 2219/39195; G05B 2219/49169; G05B 19/238
USPC ........ 700/250, 254; 318/569, 601; 901/2, 41
See application file for complete search history.

(56) References Cited

U.S. PATENT DOCUMENTS

| 7,905,699 | B2 * | 3/2011 | Sueyoshi | B25J 9/042 414/744.5 |
| 8,392,017 | B2 * | 3/2013 | Trygg | B65G 57/24 414/791.4 |
| 2007/0021868 | A1 | 1/2007 | Nagatsuka et al. | |
| 2014/0039678 | A1 | 2/2014 | Motoyoshi | |
| 2014/0276952 | A1 * | 9/2014 | Hourtash | B25J 9/1638 606/130 |

FOREIGN PATENT DOCUMENTS

| CN | 1903523 A | 1/2007 |
| CN | 103568013 A | 2/2014 |
| JP | 4-114606 U | 10/1992 |
| JP | 2002-307344 A | 10/2002 |
| JP | 2006-260010 A | 9/2006 |
| JP | 2006-293624 A | 10/2006 |
| JP | 2009-082997 A | 4/2009 |
| JP | 2014-151385 A | 8/2014 |

* cited by examiner

*Primary Examiner* — Dalena Tran
(74) *Attorney, Agent, or Firm* — Hauptman Ham, LLP

(57) ABSTRACT

A robot controller able to suppress shaking of a tool tip of a robot due to operation of a travel axis. The robot controller includes a movement calculating part calculating an amount of movement of the travel axis and an amount of movement of the tool tip each time the travel axis operates in accordance with a command and a correcting part correcting a command value so that at least one command value of a speed and acceleration to the travel axis becomes smaller when the amount of movement of the travel axis is larger than a predetermined first threshold value and the amount of movement of the tool tip is smaller than a predetermined second threshold value.

3 Claims, 5 Drawing Sheets

ROBOT CONTROLLER INHIBITING SHAKING OF TOOL TIP IN ROBOT EQUIPPED WITH TRAVEL AXIS

RELATED APPLICATIONS

The present application claims priority to Japanese Application Number 2015-158373, filed Aug. 10, 2015, the disclosure of which is hereby incorporated by reference herein in its entirety.

BACKGROUND OF THE INVENTION

1. Field of the Invention

The present invention relates to a robot controller controlling a robot equipped with a travel axis.

2. Description of the Related Art

In industrial robots, a control technique for compensating for deformation or torque of a component part caused by operation of an axis at a different location has been proposed.

Japanese Patent Publication No. 2006-293624A discloses a multi-axis controller controlling a plurality of mutually interfering axes wherein disturbance torque is estimated based on the position commands to other axes and the torques at the individual joints are corrected.

Japanese Patent Publication No. 2009-082997A discloses a robot controller which compares a speed of movement of a hand part of a robot at the different coordinate axes of the Cartesian system with threshold values and when the speed of movement of at least one coordinate axis is larger than a threshold value, makes the robot stop.

Japanese Patent Publication No. 2002-307344A discloses a robot controller performing modeling deeming the joints as springs and correcting the position and posture of the hand of the robot considering the bending at the component parts of the multiarticulated robot.

In a robot equipped with a travel axis, sometimes the travel axis makes the robot move while leaving the tool tip fixed in a certain position in space. FIG. 5 is a view of the robot 100 moving due to the travel axis 110 as seen from above. If referring to FIG. 5, the base of the robot 100 moves by the travel axis 110 from the position shown by the broken line to the position shown by the solid line, while the position of the tip 132 of the tool 130 attached to the arm 120 does not change before and after movement.

At the time such an operation is performed, an interference torque T is generated about the J1 axis of the robot 100 (axis rotating about axis extending vertical to surface at which travel axis is set) (see FIG. 6). If the speed of movement or acceleration of the travel axis 110 is large, due to the effects of the interference torque T, the position of the tip 132 of the tool 130 sometimes shakes as shown by the arrow 140 in FIG. 6. If the position of an operating point shakes in the state with hemming rollers etc. gripping a workpiece, the workpiece is liable to deform into an unintended shape.

If forming the component parts about the J1 axis by a high rigidity material, the shaking of the tool tip due to the interference torque can be suppressed. Further, by performing modeling deeming the joints as springs, it is possible to compensate for shaking of the tool tip if correcting the position of the tool tip considering the bending of the joints.

SUMMARY OF INVENTION

However, high rigidity materials are generally expensive and lead to increased costs. With the method of modeling deeming joints as springs, there are limits to approaching the behavior of the component parts of an actual robot. Sometimes a sufficient precision cannot be achieved.

Therefore, a robot controller able to suppress shaking of the tool tip of a robot due to operation of a travel axis has been sought.

In a preferred embodiment, a robot controller for controlling a multiarticulated robot provided with a tool at an arm end and a travel axis making the multiarticulated robot move back and forth, the robot controller including a movement calculating part calculating an amount of movement of the travel axis and an amount of movement of the tool tip each time the travel axis operates in accordance with a command and a correcting part correcting a command value so that at least one command value of a speed and acceleration to the travel axis becomes smaller when the amount of movement of the travel axis is larger than a predetermined first threshold value and the amount of movement of the tool tip is smaller than a predetermined second threshold value is provided.

In a preferred embodiment, the correcting part is configured to correct a command value so that the command value becomes gradually smaller as the amount of movement of the tool tip becomes smaller when the amount of movement of the travel axis is larger than the first threshold value and the amount of movement of the tool tip is smaller than the second threshold value.

In a preferred embodiment, the correcting part is configured to correct the command value so that the command value becomes small down to a predetermined lower limit value when the amount of movement of the travel axis is larger than the first threshold value and the amount of movement of the tool tip is smaller than a third threshold value smaller than the second threshold value.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1:
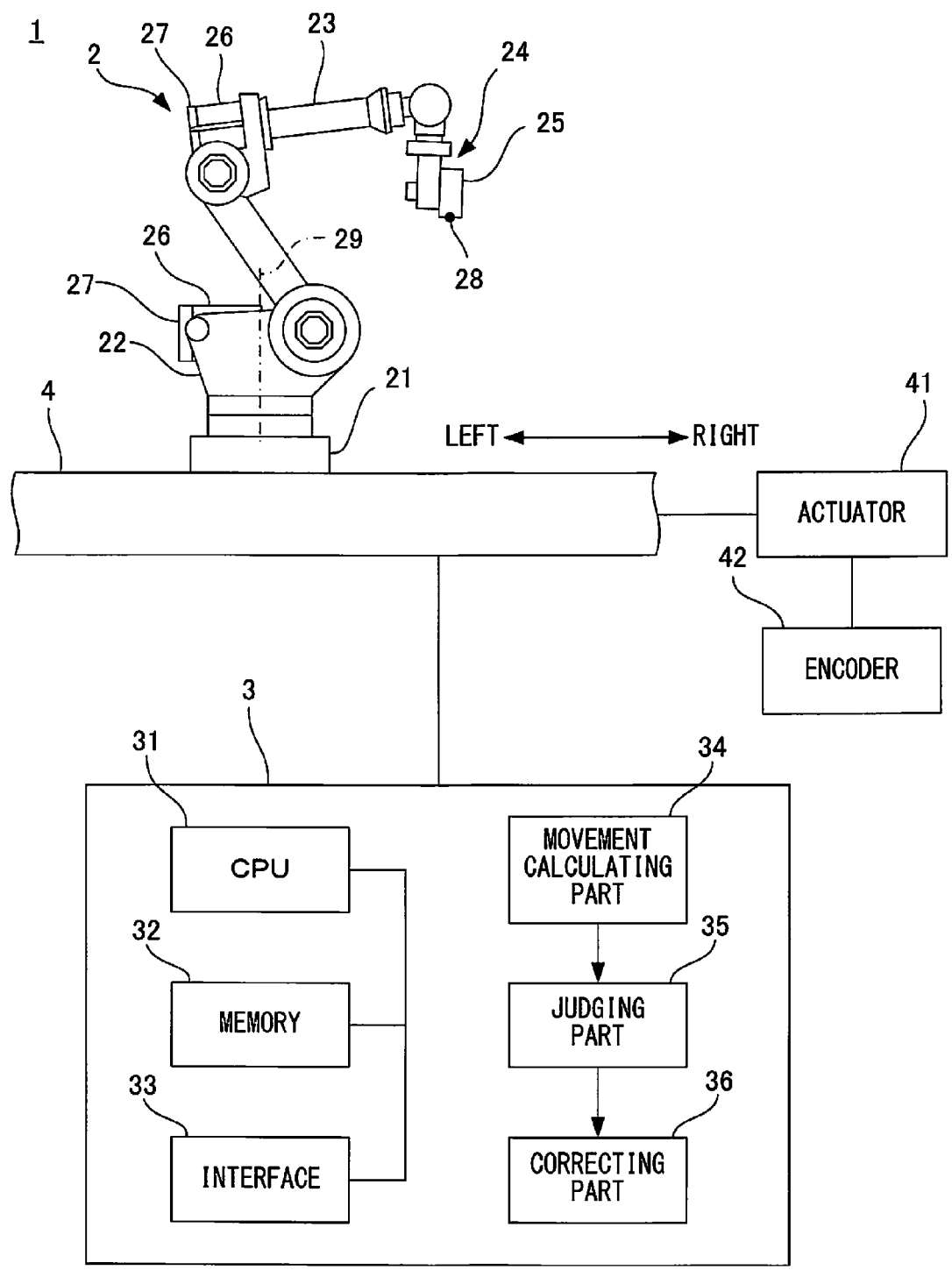
FIG. 1 is a view showing a robot system according to an embodiment.

FIG. 1 is a view showing a robot system 1 according to one embodiment. The robot system 1 includes a robot 2, a travel axis 4 making the robot 2 move back and forth, and a robot controller 3 controlling the robot 2 and travel axis 4.

The robot 2 is six-axis vertical multiarticulated robot which includes a tool, for example, hemming rollers 25, at a wrist 24 at the front of the arm 23. The robot 2 further includes a base 21 which is carried on the travel axis 4 and itself is a nonmoving part and a swivel body 22 which can swivel with respect to the base 21 around an axis 29 extending in the vertical direction. Below, an example of the robot 2 shown in FIG. 1 will be explained, but the fact that the present invention can be applied to industrial robots having other configurations will be self evident to a person skilled in the art.

The joints of the robot 2 are driven by rotary motors 26 (only several rotary motors shown). Each rotary motor 26 is provided with an encoder 27 for measuring the position, speed, etc. of the rotary motor 26.

The travel axis 4 is driven by the actuator 41 and makes the robot 2 move in the left and right directions. The actuator 41 is comprised of a linear motor or a rotary motor. When using the rotary motor as an actuator 41, the travel axis 4 has a mechanism for converting rotary motion to linear motion, for example, a ball screw. The actuator 41 of the travel axis 4 is provided with an encoder 42 which measures the position of the travel axis 4 and in turn the position, speed, etc. of the base 21 of the robot 2.

A command to the travel axis 4 may be a command which the robot controller 3 prepares in accordance with a control program or may be a manual feed command which is prepared in accordance with input from an operator.

The robot controller 3 is a digital computer having a hardware configuration including a CPU 31, memory 32, and interface 33. The CPU 31, memory 32, and interface 33 are connected with each other by a bus.

The CPU 31 runs a control program or performs processing required for performing other functions of the robot controller 3.

The memory 32 is comprised of a ROM, RAM, nonvolatile memory, etc. The ROM stores the program for overall control of the robot controller 3. The RAM temporarily stores the results of processing of the CPU 31 or the detected values of the encoders 27 and 42 etc. The nonvolatile memory stores the control programs for controlling the robot 2 and travel axis 4 and the parameters and other settings.

The interface 33 is connected to an external device, for example, a display, keyboard, operation teaching console, etc. and is used for sending and receiving signals and data with these.

The robot controller 3 uses the control program and feedback signals from the encoders 27 and 42 as the basis to impart commands to the robot 2 and travel axis 4 and control the operations of the robot 2 and travel axis 4.

Figure 5:
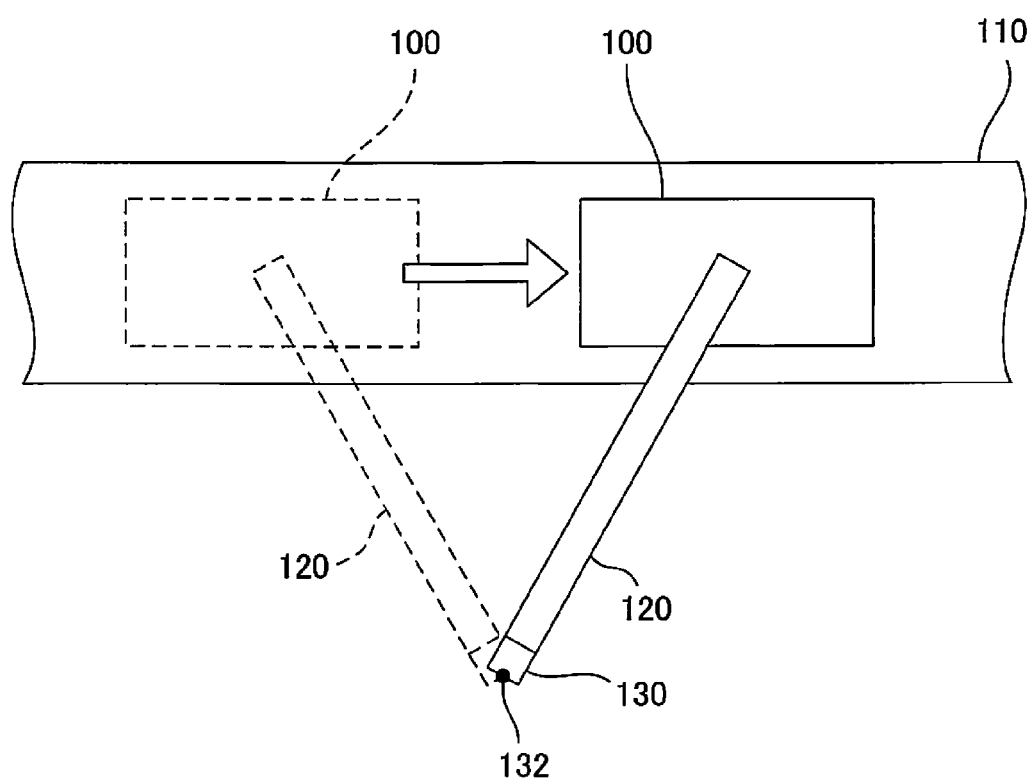
FIG. 5 is a view showing an example of operation of a robot equipped with a travel axis.
Figure 6:
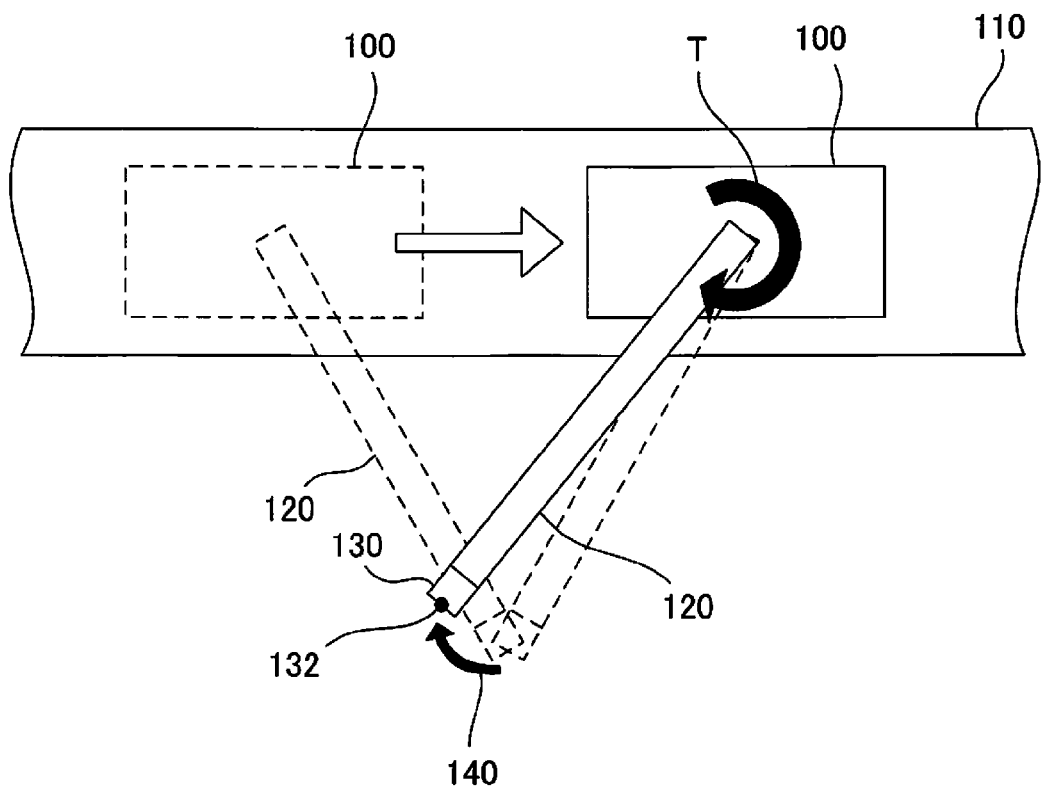
FIG. 6 is a view showing shaking of a tool tip.

In the robot system 1, as shown referring to FIG. 5 and FIG. 6, sometimes the tool tip 28 shakes due to an interference torque generated when making the travel axis 4 operate while leaving the position of the tool tip 28 fixed in 3D space.

According to the present embodiment, the robot controller 3 is comprised of a movement calculating part 34, judging part 35, and correcting part 36 for correcting the command values to the travel axis 4 and suppressing shaking of the tool tip 28.

The movement calculating part 34 calculates an amount of movement of the travel axis 4 and an amount of movement of the tool tip 28 each time the travel axis 4 operates in accordance with a command. The amount of movement of the travel axis 4 is calculated based on the command to the travel axis 4. The amount of movement of the tool tip 28 is calculated based on the commands to the rotary motors 26 driving the different joints, the system parameters inherent to the robot 2, and the amount of movement of the travel axis 4. It should be noted that the amount of movement of the tool tip 28 is the amount of movement in the world coordinate system not the robot coordinate system where the base 21 of the robot 2 is taken as a reference of the robot coordinate system.

The judging part 35 judges if the amount of movement of the travel axis 4 is larger than a predetermined first threshold value and judges if the amount of movement of the tool tip 28 is larger than a predetermined second threshold value. The results of judgment by the judging part 35 are input to the correcting part 36.

The correcting part 36 corrects the command values so that the command value of the speed or acceleration to the travel axis 4 or the command values of both become smaller when the travel axis 4 is deemed to have operated without the tool tip 28 being changed in position.

Figure 2:
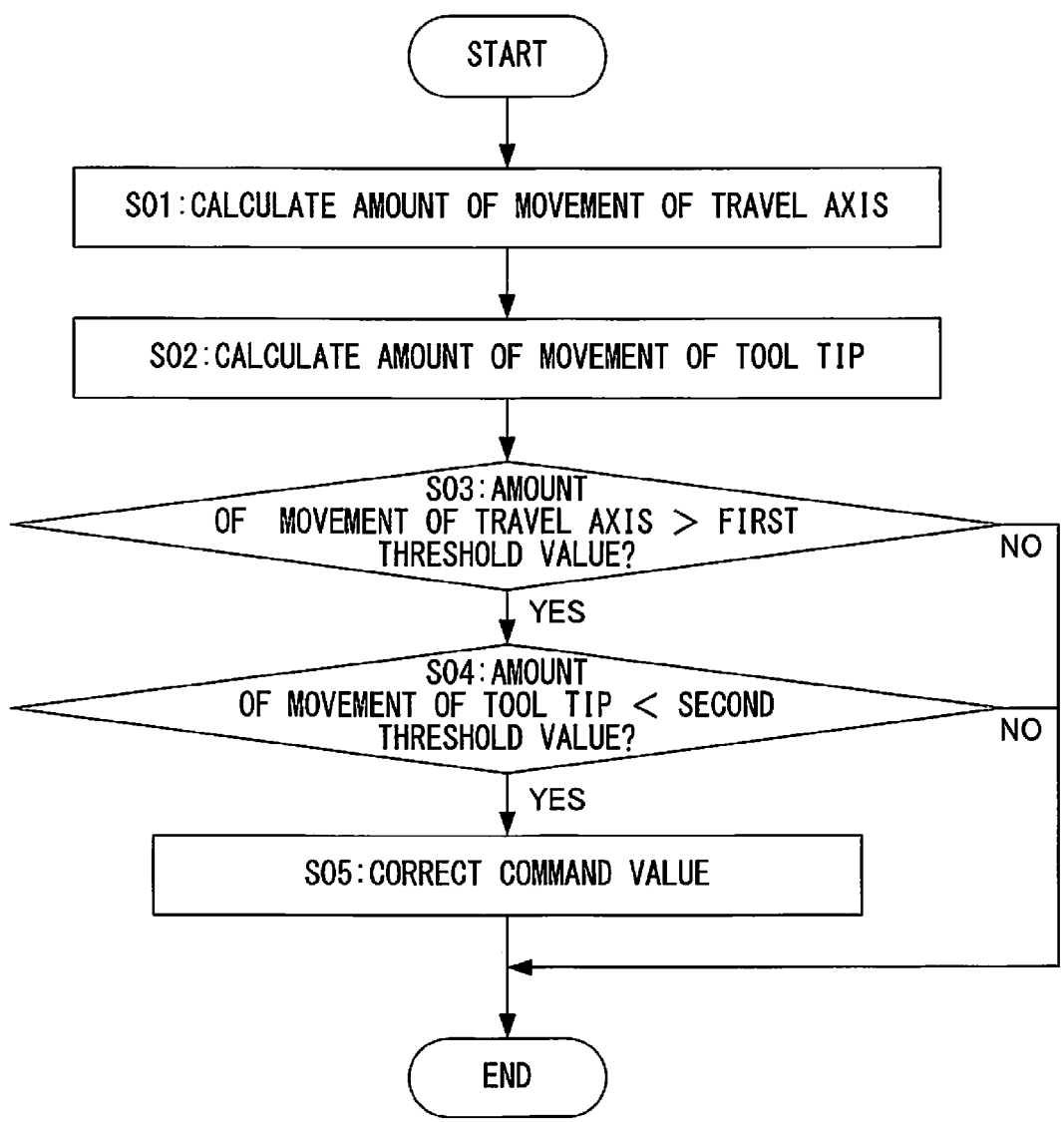
FIG. 2 is a flow chart showing processing for correction of a command value performed by the robot controller.

Next, referring to FIG. 2, the processing performed by the robot controller 3 according to the present embodiment will be explained. The processing of the later explained steps S01 to S05 is performed each time a command to the travel axis 4 is executed. For example, when the travel axis 4 moves from a first position to a second position in the right direction and then moves from the second position to a third position in the left direction, the above processing is performed when the travel axis 4 moves from the first position to the second position. Further, the above processing is performed again when the travel axis 4 moves from the second position to the third position.

At step S01, the movement calculating part 34 calculates the amount of movement of the travel axis 4 corresponding to the input command. At step S02, the movement calculating part 34 calculates the amount of movement of the tool tip 28 in a 3D space while the travel axis 4 is moving exactly by the amount of movement calculated at step S01.

At step S03, the judging part 35 judges if the amount of movement of the travel axis 4 is larger than the first threshold value. The first threshold value is suitably set so as to enable judgment as to if the travel axis 4 has moved. For example, the first threshold value is generally set to a value close to zero.

Alternatively, the first threshold value may be set in accordance with the amount of movement of the travel axis 4 so that the shaking of the tool tip 28 becomes sufficiently small. For example, if the amount of movement of the travel axis 4 is sufficiently small and the travel axis 4 stops before the speed of movement becomes large, the shaking of the tool tip 28 need not be considered. In this way, the judgment at step S03 will sometimes be no even if the amount of movement of the travel axis 4 is not zero.

If the result of judgment at step S03 is yes, the routine proceeds to step S04. At step S04, the judging part 35 judges if the amount of movement of the tool tip 28 is smaller than a second threshold value. The second threshold value is suitably set so that it can be judged if the position of the tool tip 28 has changed between before and after movement of the travel axis 4. If the amount of movement of the tool tip 28 is calculated in the world coordinate system, the second threshold value is set to a value close to about zero.

If the result of judgment at step S04 is yes, the routine proceeds to step S05. At step S05, the correcting part 36 decreases the command value to the travel axis 4. The corrected command value may be a speed command value or an acceleration command or may be both.

When the result of judgment at step S03 is no or when the result of judgment at step S04 is no, it is deemed that there is no need to correct the command value to the travel axis 4 and the processing is ended. In this case, the travel axis 4 operates in accordance with the originally input command values. Typically, command values corresponding to the maximum speed and maximum acceleration are given to the travel axis 4.

Figure 3:
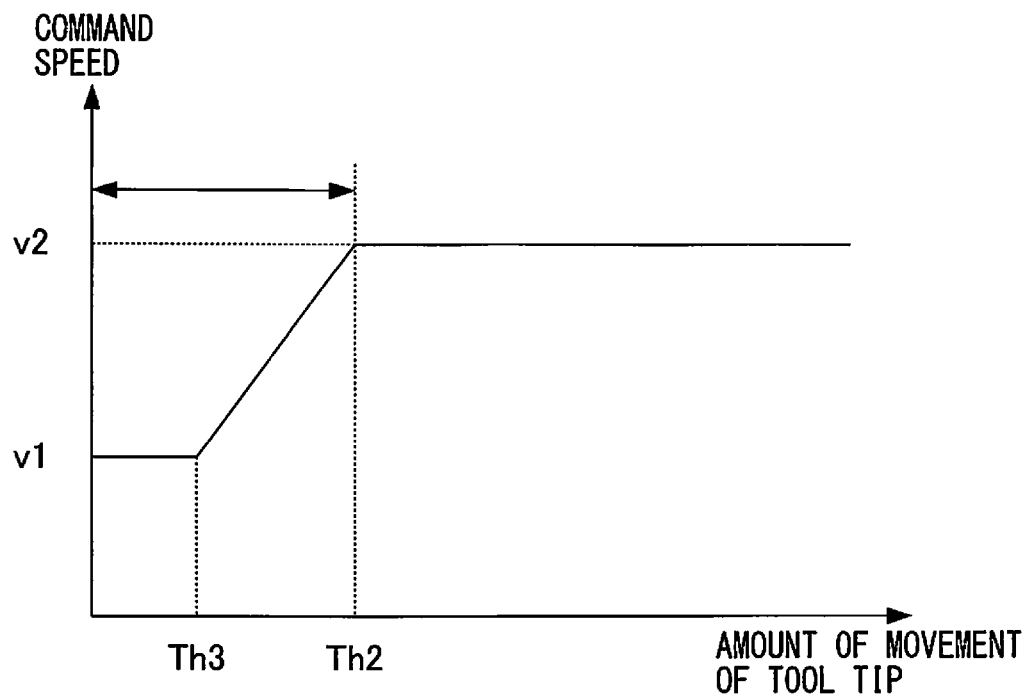
FIG. 3 is a view showing a relationship between an amount of movement of a tool tip and a command speed.

Next, referring to FIG. 3 and FIG. 4, an example of the processing for correction of the command values will be explained. FIG. 3 shows the relationship between the amount of movement of the tool tip 28 and the command speed to the travel axis 4. As illustrated, when the amount of movement of the tool tip 28 is the second threshold value Th2 or more, a speed command v2 corresponding to the maximum speed is given to the travel axis 4. If the amount of movement of the tool tip 28 is smaller than a third threshold value Th3 smaller than the second threshold value Th2, the speed command v1 corresponding to the minimum speed is given to the travel axis 4.

When the amount of movement of the tool tip 28 is in a range between the second threshold value Th2 and the third threshold value Th3, a speed command by which the speed gradually becomes smaller as the amount of movement of the tool tip 28 becomes smaller is given to the travel axis 4.

Figure 4:
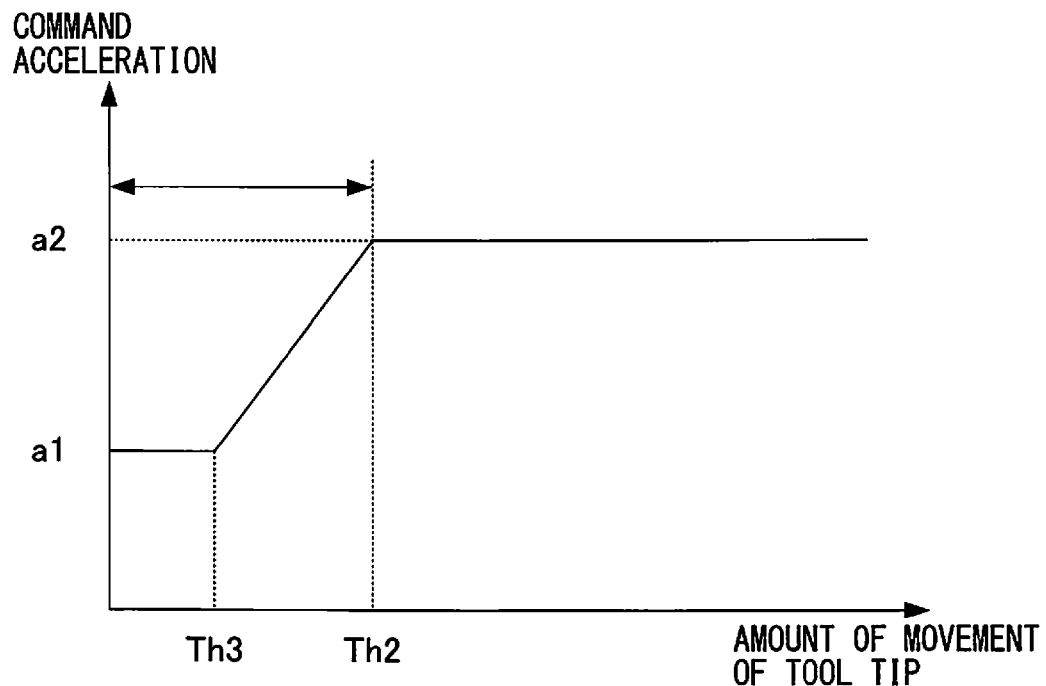
FIG. 4 is a view showing a relationship between an amount of movement of a tool tip and a command acceleration.

FIG. 4 shows the relationship between the amount of movement of the tool tip 28 and the command acceleration to the travel axis 4. As illustrated, when the amount of movement of the tool tip 28 is the second threshold value Th2 or more, an acceleration command a2 corresponding to the maximum acceleration is given to the travel axis 4. When the amount of movement of the tool tip 28 is smaller than a third threshold value Th3 smaller than the second threshold value Th2, an acceleration command a1 corresponding to the minimum acceleration is given to the travel axis 4.

When the amount of movement of the tool tip 28 is in a range between the second threshold value Th2 and the third threshold value Th3, an acceleration command by which the acceleration gradually becomes smaller as the amount of movement of the tool tip 28 becomes smaller is given to the travel axis 4.

According to the robot controller 3 according to the present embodiment, when making the travel axis 4 operate while fixing the tool tip 28 in position, the command values are corrected so that the speed or acceleration of the travel axis 4 or both are limited. Due to this, shaking of the tool tip due to operation of the travel axis 4 can be suppressed and the positioning precision of the robot 2 can be improved. Further, when using the robot 2 for working a workpiece by hemming rollers 25, it is possible to prevent the workpiece from deforming to an unintended shape due to shaking of the tool tip 28.

The position of the base 21 of the robot 2 can be changed by the travel axis 4 while performing work using the tool, so the robot system 1 can smoothly move to the next process and the cycle time can be cut.

If the tool tip 28 moves, the travel axis 4 can make the robot 2 move by the maximum speed without the processing for correction by the correcting part 36 being performed. Therefore it is possible to maintain the reliability of the work using the tool while keeping the cycle time from increasing more than necessary.

There is no need to use an expensive high rigidity material for the component parts of the robot 2, so the robot system 1 can be inexpensively provided.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the robot controller according to the present invention, when making the travel axis move while mixing the position of the tool tip, the command values are corrected so that the speed or acceleration of the travel axis becomes smaller. Due to this, shaking of the tool tip due to operation of the travel axis can be suppressed.

What is claimed is:

1. A robot controller for controlling a multiarticulated robot provided with a tool at an arm end and a travel axis making the multiarticulated robot move back and forth, the robot controller comprising:
   a movement calculating part calculating an amount of movement of the travel axis and an amount of movement of the tool tip each time the travel axis operates in accordance with a command; and
   a correcting part that corrects a command value so that at least one command value of a speed and acceleration to the travel axis becomes smaller when the amount of movement of the travel axis is larger than a predetermined first threshold value and the amount of movement of the tool tip is smaller than a predetermined second threshold value.

2. The robot controller according to claim 1, wherein the correcting part is configured to correct the command value so that the command value becomes gradually smaller as the amount of movement of the tool tip becomes smaller when the amount of movement of the travel axis is larger than the first threshold value and the amount of movement of the tool tip is smaller than the second threshold value.

3. The robot controller according to claim 1, wherein the correcting part is configured to correct the command value so that the command value is reduced to a predetermined lower limit value when the amount of movement of the travel axis is larger than the first threshold value and the amount of movement of the tool tip is smaller than a third threshold value that is smaller than the second threshold value.

* * * * *